(12) United States Patent
Goodwin et al.

(10) Patent No.: US 7,984,859 B2
(45) Date of Patent: Jul. 26, 2011

(54) AUTOMATIC EXHAUST FAN CONTROL APPARATUS AND METHOD

(76) Inventors: Marcus S. Goodwin, Seale, AL (US); Norman Risner, Midland, GA (US)

( * ) Notice: Subject to any disclaimer, the term of this patent is extended or adjusted under 35 U.S.C. 154(b) by 446 days.

(21) Appl. No.: 12/218,283

(22) Filed: Jul. 14, 2008

(65) Prior Publication Data

US 2010/0006661 A1    Jan. 14, 2010

(51) Int. Cl.
*F24F 3/14* (2006.01)
*G05D 22/02* (2006.01)

(52) U.S. Cl. .................. 236/44 A; 236/46 C; 236/49.3; 4/213

(58) Field of Classification Search ............... 236/44 A, 236/46 C, 46 R, 49.3; 454/341; 4/209 R, 4/213
See application file for complete search history.

(56) References Cited

U.S. PATENT DOCUMENTS

| | | | |
|---|---|---|---|
| 6,935,570 B2 | 8/2005 | Acker, Jr. | |
| 7,325,748 B2 * | 2/2008 | Acker, Jr. | 236/44 A |
| 7,690,583 B2 * | 4/2010 | Cherewatti et al. | 236/44 A |
| 2006/0213000 A1 | 9/2006 | Kimble et al. | |

FOREIGN PATENT DOCUMENTS

| | | |
|---|---|---|
| JP | 5180475 | 7/1993 |
| JP | 8014631 | 1/1996 |

* cited by examiner

*Primary Examiner* — Marc E Norman
(74) *Attorney, Agent, or Firm* — James Ray & Assoc

(57) ABSTRACT

A control apparatus for operating an exhaust fan in order to control humidity and odor in an enclosed confine includes a switch mounted within a path of electric power between an electric power source and the exhaust fan. A humidity sensor outputs a humidity signal defining level of relative humidity within the enclosed confine and a resistive voltage divider provides a reference voltage signal. A comparator compares the humidity signal with the reference signal and provides a control signal when a value of the humidity signal is equal to or greater than a value of the reference signal, the control signal causing the switch to supply the electric power to the exhaust fan. A timing circuit is activated by the control signal and is operable to maintain presence thereof for a predetermined period of time when the value of the humidity signal decreases below the value of the reference signal.

14 Claims, 2 Drawing Sheets

AUTOMATIC EXHAUST FAN CONTROL APPARATUS AND METHOD

FIELD OF THE INVENTION

The present invention relates, in general, to ventilation systems and, more particularly, this invention relates to a control apparatus for controlling humidity and odor levels in enclosed confines.

BACKGROUND OF THE INVENTION

As is generally well known uncontrolled humidity in rooms, bathrooms, basements and the like confines leads to their deteriorating conditions. Effects of uncontrolled humidity are particularly felt in the bathrooms where the moist air condenses on the various surfaces generally leading to mold and mildew growth. Thus, rooms, particularly bathrooms, must be properly ventilated in order to control humidity levels. In bathroom applications, an exhaust ceiling fan is employed for ventilation and is generally manually operated by way of a wall switch. However, it has been found that often the fan is either not operating for a sufficient period of time either due to the user forgetting to actuate the switch or prematurely deactivating it or is left running for a longer than required period of time, if the user forgets to turn it off, thus wasting electric energy.

It is also generally known that the exhaust fan in the bathroom is employed for removing unpleasant human waste odors and is usually operable while the user occupies the bathroom. The exhaust fan is generally turned off when the user leaves the bathroom. However, it has been found that often odor remains in the bathroom after the exhaust fan has been turned off.

Prior to the conception and design of the present invention, efforts have been made to alleviate problems of manually controlling the exhaust fan. U.S. Pat. No. 6,935,570 issued to Acker discloses a ventilation controller that includes at least one humidity sensor for controlling the humidity of a room. The ventilation controller incorporates a housing sized and shaped to replace, or be placed in, a standard electrical junction box. Circuitry in the controller receives data from the sensor(s). The controller automatically switches on power to an exhaust fan when either the humidity exceeds a manually set humidity level and/or a rapid increase in humidity is observed. When a plurality of sensors is employed, the humidity level from a first sensor is compared by logic circuitry to the humidity levels detected at a reference sensor(s). When the humidity at the first sensor exceeds the humidity at the reference sensor(s), the ventilation controller switches on power to the exhaust fan. When the humidity at the first sensor falls below the humidity at the reference sensor(s), the ventilation controller switches off power to the exhaust fan. Teachings of U.S. Pat. No. 6,935,570 are incorporated into this document by reference thereto.

In U.S. Pub. No. 2006/0213000 published on Sep. 28, 2008, Kimble et al. discloses an automatic control system for an exhaust fan of a room, such as a bathroom, having a water dispensing conduit is disclosed. The system includes a control module that controls delivery of electricity to the exhaust fan to activate and deactivate the exhaust fan, and a sensor suitable for mounting on the water dispensing conduit. The sensor senses temperature of the water dispensing conduit and when a temperature increases (due to hot water flowing though the water dispensing conduit) above a predetermined temperature value is reached on the water dispensing conduit, the sensor transmits a control signal to the control module. Upon receipt of the control signal, the control module activates the exhaust fan for a user selectable time period. The control module may also include a timer circuit that provides electricity to the fan for a predetermined time period after temperature falls below the predetermined temperature value. The predetermined time period may be a variable time period selectable by a user.

However, it has been found that additional improvements in controlling humidity and disposing of unpleasant human waste odors are required.

SUMMARY OF THE INVENTION

The invention provides an apparatus for controlling at least one of a humidity and odor in an enclosed confine in combination with an air moving device. The apparatus includes a switch mounted within a path of electric power between an electric power source and the air moving device. The switch is operable by a presence of a control signal to supply the electric power to the air moving device and is operable by an absence of the control signal to remove the electric power therefrom. A humidity sensor is mounted in a predetermined location and is operable to output a humidity signal defining level of relative humidity within the enclosed confine. The humidity signal is a voltage signal. A resistive voltage divider provides a reference voltage signal associated with a predetermined level of humidity. There is means coupled to each of the humidity sensor and the resistive voltage divider for comparing the humidity signal with the reference signal and providing the control signal when a value of the humidity signal is equal to or greater than a value of the reference signal. The control signal causes the switch to supply the electric power to the air moving device. A timing circuit is activatable by the control signal and is operable to maintain the presence thereof for a predetermined period of time when the value of the humidity signal decreases below the value of the reference signal.

The present invention also provides a method for operating an exhaust fan mounted within an enclosed confine in order to control at least one of a humidity and odor therewithin. The method includes the step of outputting, with a humidity sensor, a humidity signal defining level of relative humidity within the enclosed confine. Then, providing a reference humidity signal associated with a predetermined level of humidity. Next, comparing the humidity signal with the reference signal. Providing a control signal when a value of the humidity signal is equal to or greater than a value of the reference signal. Then, activating, with the control signal a switch mounted within a path of electric power between an electric power source and the air moving device. Next, supplying, with the switch, an electric power to the air moving device. Providing a timing circuit. Then, activating the timing circuit with the control signal. Next, maintaining, with the timing circuit, the control signal for a first predetermined period of time when the value of the humidity signal decreases below the value of the reference signal. Finally, removing the electric power from the air moving device upon expiration of the timing circuit.

OBJECTS OF THE INVENTION

It is, therefore, one of the primary objects of the present invention to provide a control apparatus for controlling humidity and odor levels in enclosed confines in combination with an air moving device.

Another object of the present invention is to provide a humidity and odor control apparatus that is triggered by a preset level of humidity.

Yet another object of the present invention is to provide humidity and odor control apparatus that provides for automatic shut-off of the air moving device after a preset period of time.

A further object of the present invention is to provide humidity and odor control apparatus that that can be manually activated.

Yet a further object of the present invention is to provide a humidity and odor control apparatus that prevents undue tampering by children.

An additional object of the present invention is to provide a humidity and odor control apparatus that draws low levels of electrical power during operation.

Another object of the present invention is to provide a humidity and odor control apparatus that can be sized to fit into a conventional wall-mounted electrical junction box.

Yet another object of the present invention is to provide a humidity and odor control apparatus that is economical to manufacture.

A further object of the present invention is to provide a humidity and odor control apparatus that is simple to install and use.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
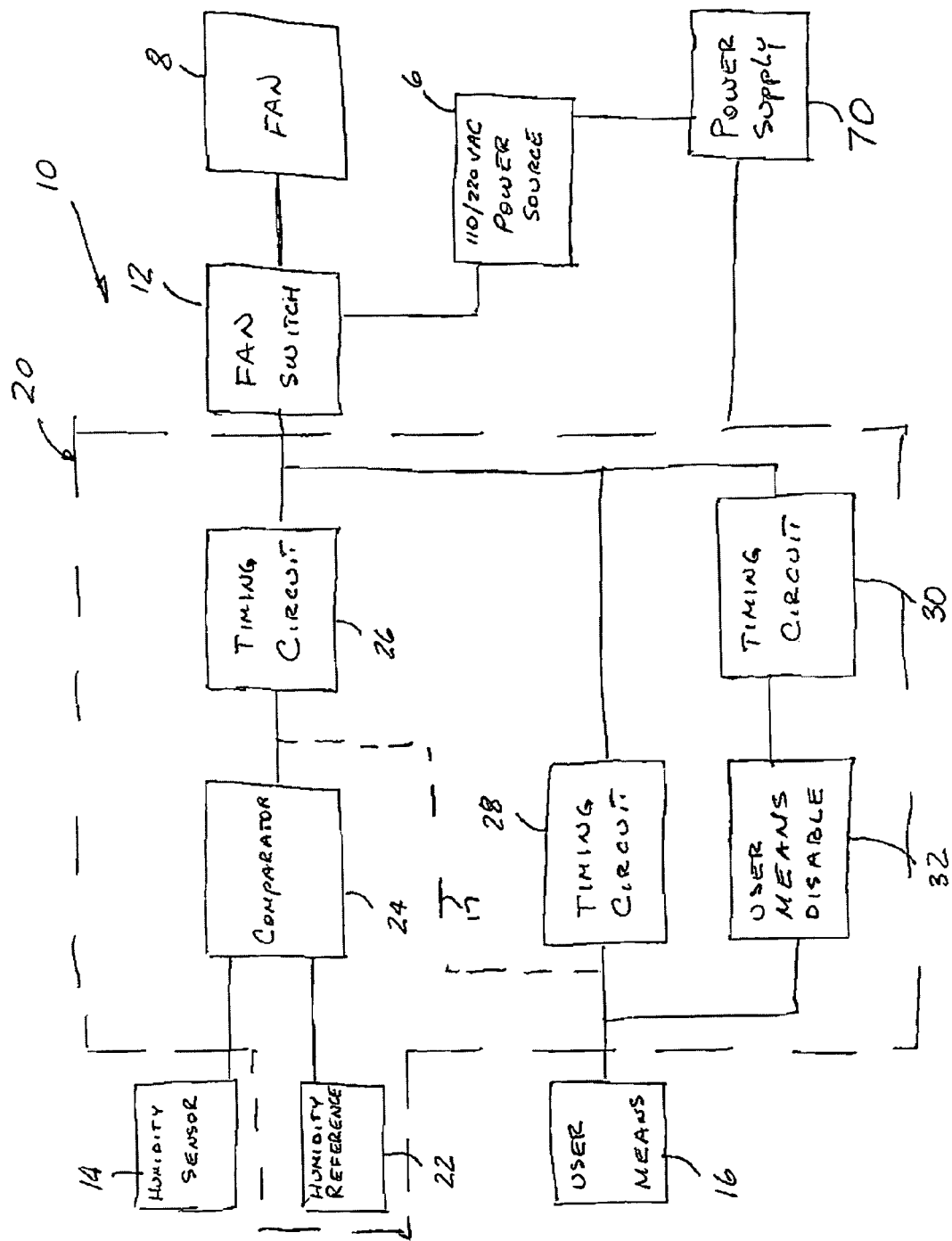
FIG. 1 is a block diagram of a humidity and odor control apparatus of the present invention.
Figure 2:
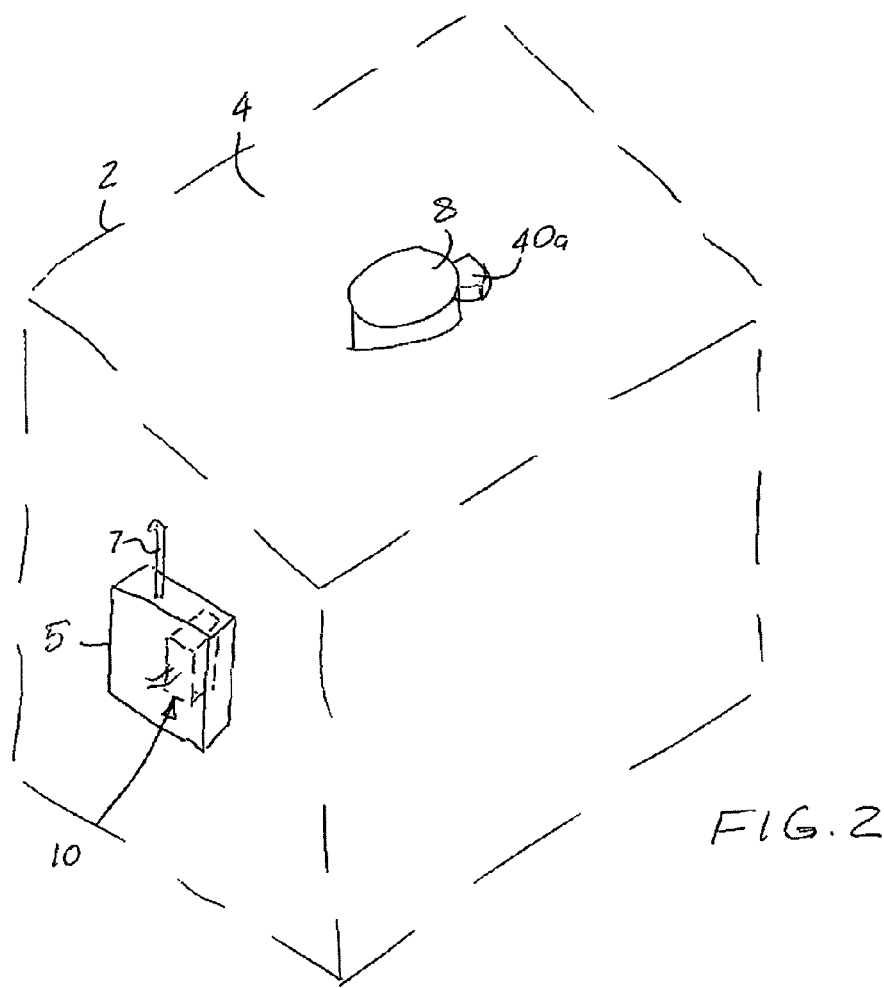
FIG. 2 is an environmental view depicting the use of the apparatus of FIG. 1.
Figure 3:
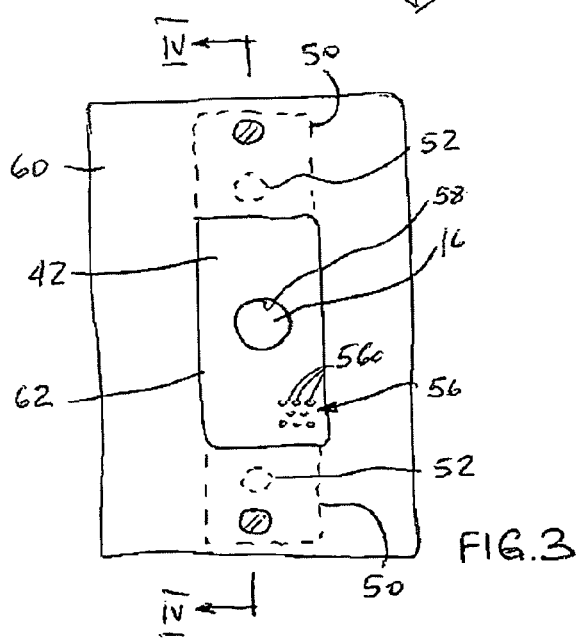
FIG. 3 is a front elevation view depicting a wall mounted apparatus of FIG. 1.
Figure 4:
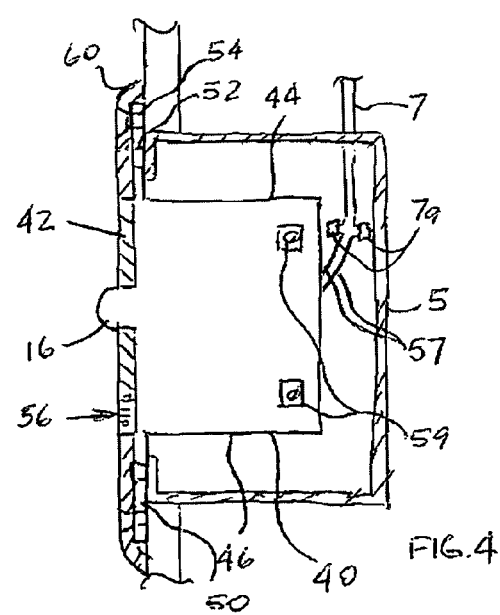
FIG. 4 is a cross-sectional view of the humidity and odor control apparatus along lines 4-4 of FIG. 3.

Prior to proceeding to the more detailed description of the present invention, it should be noted that, for the sake of clarity and understanding, identical components which have identical functions have been identified with identical reference numerals throughout the several views illustrated in the drawing figures.

The best mode for carrying out the invention is presented in terms of its presently preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The present invention provides a novel control apparatus, generally designated as 10, which is operable in combination with an air moving device 8 for controlling at least one of a humidity and odor in an enclosed confine 2.

Reference is now made, to FIGS. 1-4, wherein the control apparatus 10 is shown as controlling odor and humidity in a room, such as a bathroom 2, and further in combination with a conventional exhaust fan 8 mounted within the ceiling portion 4.

According to a first embodiment of the invention, the control apparatus 10 includes a switch 12 which is mounted within a path of electric power between an electric power source 6 and the exhaust fan 8. Generally, such power source supplies 110/220 VAC load. Such switch 12 is operable by a presence of a control signal to supply the electric power to the exhaust fan 8 and is operable by the absence of the control signal to remove the electric power therefrom. Preferably, the switch 12 is a relay. Although, any electro-mechanical relays can be used in the present invention, it is presently preferred to employ a solid state relay (SSR) which, as well known, is an electronic switch contains no moving parts. It is further presently preferred to use a photo-coupled SSR that is controlled by a low voltage signal optically isolated from the load. Such relay may be of the type as manufactured by Yangming Electric Corp. of Taiwan under a model SSR-P03DA In the present invention, the photo-coupled SSR type relay has been found advantageous to reduce the overall space envelop of the control apparatus 10 and to enable low electrical power consumption during operation. Additionally and, more importantly, this relay fails in an open state thus disabling power supply to the exhaust fan 8 and preventing unintended and prolong operation thereof.

The apparatus 10 further includes a humidity sensor 14 which is mounted in a predetermined location and which is continuously operable to output a humidity signal defining the relative humidity within the bathroom 2. It is presently preferred that the humidity sensor 14 is of a solid-state type capable of outputting a voltage signal directly proportional to relative humidity within the bathroom 2. Such sensor may be of the type as manufactured by Honeywell International Inc. of Morristown, N.J. under HIH-40000-003 brand.

The apparatus 10 further includes a controller, generally designated as 20. The controller 20 includes means for providing a reference voltage signal associated with a predetermined level of humidity. Preferably, such means is a resistive voltage divider 22 which is advantageous in resisting electrical spikes or noises. It is also within the scope of the present invention to provide a voltage divider circuit that enables the user of the exhaust fan 8 to select more than one humidity set levels in order to accommodate various climatic and operational conditions. There is a comparator means 24 coupled to each of the humidity sensor 14 and the resistive voltage divider 22 for comparing the humidity signal with the reference signal and providing the control signal when a value of the humidity signal is equal to or greater than a value of the reference signal, with the control signal causing the switch 12 to supply the electric power to the exhaust fan 8. There is no need to save any values or reading to memory in the present invention. A timing circuit 26 is also provided and is activated by a presence of the control signal from the comparator 24 to maintain its presence for a predetermined period of time when the value of the humidity signal decreases below the value of the reference signal and the output from the comparator changes to its normal value.

In one form of this embodiment, the switch 12, humidity sensor 14 and controller 20 are mounted within an optional hollow housing 40 which is sized for fitting into a conventional single-switch wall-mounted electric junction box 5. Now in further reference to FIGS. 3-4, the hollow housing 40 has a pair of flanges 50 disposed coplanar with and setback from a generally rectangular front wall 42 of the housing 40. One of the pair of flanges 50 extends upwardly from a top wall 44 of the housing 40 and an opposed one of the pair of flanges 50 extends downwardly from a bottom wall 46 of the housing 40 being mounted within the electrical junction box 5. A mounting aperture 52 is formed in each flange for securing the housing 40 to the electrical junction box 5 with conventional fasteners (not shown). A threaded aperture 54 is also formed in the each flange 50 adjacent to an end thereof for enabling attachment of a conservational cover 50 having a rectangular opening 62 formed therethrough. The front wall 42 of the housing 40 fits within the rectangular opening 62 with its exterior surface being disposed generally coplanar with an exterior surface of the housing 40. Accordingly, the flanges 50 are generally setback from the exterior surface of the front wall 42 by the thickness of the cover 60. A port 56 is formed by a plurality of apertures 56a arranged in a predetermined pattern through the front wall 42 with the humidity sensor 14 being positioned adjacent and aligned with the port 56.

The advantage of such housing enables simple installation of the apparatus 10 into an existing junction box 5 using the existing cover 60, thus minimizing retrofit costs.

The connection to electrical wires 7 connected to the power source 6 can be achieved in a verity of conventional methods, for example with wires 57 extending beyond the boundary of the housing 40 and coupled to such electrical wires 7 with electrical twist nuts 7a. Alternatively to or in addition to the wires 57 terminals 59 may be provided for such connection purposes.

Alternatively, the switch 12, humidity sensor 14 and controller 20 may be mounted directly to the inner surface of the cover 60 absent the opening 62, wherein the port 56 will be formed through the thickness of the cover 60.

In another form of this embodiment, the switch 12, humidity sensor 12 and controller 20 are mounted in close proximity to the exhaust fan 8 either directly within its drive mechanism enclosure or by affixing a modified housing 40a, containing these components, thereto.

Thus, in accordance with above-describe embodiment, the exhaust fan 8 operates for a period of time after the humidity levels decrease to a set user-selected level thus enhancing humidity removal from the bathroom 2. The time period is predetermined based on the configuration and size of the bathroom 2, positioning of the exhaust fan 8, positioning of the humidity sensor 14 and general climatic condition applicable to a particular geographic area wherein the control apparatus 10 is being used. It would be appreciated that a longer duration may be necessary for hot and humid southern climates as opposed to cooler and dryer northern ones.

The additional time to remove humidity has been also found advantageous in applications where the humidity sensor 14 and/or the exhaust fan 8 are mounted somewhat remotely from the humidity producing member of the bathroom 2 such as a shower or a bathtub (not shown), particularly in a larger size bathrooms, bathrooms where only one exhaust fan is used or bathrooms that have partitions or compartments. A consideration must be also given to the fact that condensation naturally dissipates in an upward direction, starting at the floor of the bathroom 2. Thus, in prior art devices, a humidity sensor 14 mounted in the wall switch module mediate the height of the bathroom may sense normal humidity and terminate operation of the exhaust fan 8 before the condensation dissipates in the upper region of the bathroom 2. In the present invention, such premature termination is eliminated by the presence of the timing circuit 26 continuing to operate the exhaust fan 8 after the comparator 24 switches its output state.

According to another embodiment of the invention, the control apparatus 10 includes the above described switch 12, humidity sensor 14 and controller 20. The control apparatus 10 also includes user means 16 for providing the control signal independently from the comparator 24. Such user means 16 is at least one of a manually operable on/off switch, a motion detection sensor, a wireless receiver and a voice recognition device. The on/off switch may be of any well known type including but not limited to rocker, pushbutton, touch and the like device. User means 16 of a wireless type may be advantageous for operating the exhaust fan 8 by way of a mobile communication device such as a cell phone (not shown). The voice recognition device may be of any conventional type capable of converting a voice command into a voltage output, for example as taught in U.S. Pat. No. 4,349,969 issued to Kellett and incorporated into this document by reference thereto. It is presently preferred to employ a simple pushbutton switch 16 to enable the user to manually operate the exhaust fan 8. It is further presently preferred to incorporate such pushbutton switch 16 into the housing 40 by providing an aperture 58 vertically aligned with the port 56, wherein an operating portion of the switch 16 extends through the aperture 58.

In one form of this embodiment, the means 16 is employed in combination with the timing circuit 26, as indicated by line 17 in FIG. 1. It would be appreciated that the control apparatus 10 constructed in accordance with this embodiment enables the user to activate the exhaust fan 8 independently from the humidity levels wherein the exhaust fan 8 deactivates without user action (or automatically) upon expiration of the timing circuit 26. Thus, the user can now remove unpleasant odors or smells that require extra time and exit the bathroom 2 without concern for returning and manually turning the exhaust fan 8 off.

In another form of this embodiment, the controller 20 includes an additional timing circuit 28 that is coupled to the user means 16 and that is operable thereby to maintain the control signal for a second predetermined period of time upon activation of the means 16, whereby the switch 12 is deactivated after expiration of the second predetermined period of time to remove the electric power from the air moving device 8.

The advantage of the second timing circuit 28 is in cooperating with the timing circuit 26 and providing a sufficient period of time to remove unpleasant odors and smells, partially based on the size and configuration of the bathroom 2.

By way of one example, the second period of time may be greater than the first period of time. Thus, when the means 16 is activated after the humidity levels have reduced below a set value and while the exhaust fan 8 is operable by the timing circuit 26, the exhaust fan 8 will continue to operate after expiration of the timing circuit 26. It is also within the scope of the present invention to provide substantially identical first and second timing circuits 26 and 28 respectively.

In accordance with a presently preferred embodiment of the invention, the control apparatus 10 includes a third timing circuit 30 activated by the user means 16 at a predetermined time delay after activation of the second timing circuit 28 and operable for a third predetermined period of time. There is also provided a circuit 32 which is disposed serially with the third timing circuit 30 and is operable thereby for a third predetermined period of time to prevent repetitive activation of the user means 16 from affecting operation of the exhaust fan 8. Such switch disabling circuit 32 deactivates upon expiration of the third predetermined period of time to permit operation of the user means 16 to reactivate the exhaust fan 8.

During development of the present invention, it has been found that such third circuit 32 is advantageous in preventing children from repetitively using the user means 16 of the switch type to trigger the operation of the exhaust fan 8.

The final essential element of the control apparatus 10 is a power supply 70 for supplying operating power to at least one of the first switch 12, humidity sensor 14 and the controller 20. It is presently preferred for such power supply 70 to be a well known A-D converter capable of converting 110/220 VAC into a generally 5 VDC operating voltage.

The use of solid state devices and circuits enables the control apparatus 10 of the present invention to draw less than fifteen milliamps of current in a loaded condition during operation thus providing for low energy consumption.

Although the present invention has been shown in terms of removing humidity and odor in the bathroom environment, it will be apparent to those skilled in the art, that the present invention may be applied to other enclosed confines of a building. For example, the control apparatus 10 of the present invention may be employed with a dehumidifier device mounted in the basement as well as an exhaust fan mounted in the attic.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. In combination with an air moving device, an apparatus for controlling at least one of a humidity and odor in an enclosed confine, said apparatus comprising:
    (a) a switch mounted within a path of electric power between an electric power source and said air moving device, said switch operable by a presence of a control signal to supply said electric power to said air moving device and is operable by an absence of said control signal to remove said electric power therefrom;
    (b) a humidity sensor mounted in a predetermined location and is operable to output a humidity signal defining level of relative humidity within said enclosed confine, said humidity signal being a voltage signal;
    (c) a resistive voltage divider for providing a reference voltage signal associated with a predetermined level of humidity;
    (d) means coupled to each of said humidity sensor and said resistive voltage divider for comparing said humidity signal with said reference signal and providing said control signal when a value of said humidity signal is equal to or greater than a value of said reference signal, said control signal causing said switch to supply said electric power to said air moving device;
    (e) a first timing circuit activatable by said control signal and is operable to maintain said presence thereof for a predetermined period of time when said value of said humidity signal decreases below said value of said reference signal;
    (f) means operable by a user for providing said control signal independently from said comparing means;
    (g) a second timing circuit coupled to said user operable means and operable thereby to maintain said control signal for a second predetermined period of time upon activation of said user operable means, whereby said switch is deactivated after expiration of said second predetermined period of time to remove said electric power from said air moving device; and
    (h) a third timing circuit activatable by said user operable means at a predetermined time delay after activation of said second timing circuit and is operable for a third predetermined period of time.

2. In combination with an air moving device, an apparatus for controlling at least one of a humidity and odor in an enclosed confine, said apparatus comprising:
    (a) a first switch mounted within a path of electric power between an electric power source and said air moving device, said first switch operable by a presence of a control signal to supply said electric power to said air moving device and is operable by an absence of said control signal to remove said electric power therefrom;
    (b) a humidity sensor mounted in a predetermined location and is operable to output a humidity signal defining level of relative humidity within said enclosed confine, said humidity signal being a voltage signal;
    (c) a second switch operable to provide said control signal independently from said comparing means;
    (d) a controller including:
        i. a resistive voltage divider for providing a reference voltage signal associated with a predetermined level of humidity,
        ii. a comparing means coupled to each of said humidity sensor and said resistive voltage divider and operable to compare said humidity signal with said reference signal and provide said control signal when a value of said humidity signal is equal to or greater than a value of said reference signal, said control signal causing said first switch to supply said electric power to said air moving device,
        iii. a first timing circuit activatable by said control signal and is operable to maintain said presence thereof for a first predetermined period of time when said value of said humidity signal decreases below said value of said reference signal,
        iv. a second timing circuit coupled to said second switch and operable thereby to maintain said control signal for a second predetermined period of time upon activation of said second switch, whereby said first switch is deactivated after expiration of said second predetermined period of time to remove said electric power from said air moving device,
        v. a third timing circuit activatable by said second switch at a predetermined time delay after activation of said second timing circuit and is operable for a third predetermined period of time, and
        vi. a second switch disabling circuit disposed serially with said third timing circuit and is operable thereby for a third predetermined period of time to prevent repetitive activation of said second switch from affecting operation of said air moving device, said second switch disabling circuit deactivatable upon expiration of said third predetermined period of time to permit operation of said second switch to reactivate said air moving device; and
    (e) a power supply for supplying operating power to at least one of said first switch, humidity sensor second switch and controller.

3. The apparatus, according to claim 2, wherein said first switch is a relay.

4. The apparatus, according to claim 3, wherein said relay is a photo-optic relay.

5. The apparatus, according to claim 2, wherein said second switch is at least one of an on/off switch, a motion detection sensor, a wireless receiver and a voice recognition device.

6. The apparatus, according to claim 2, wherein said apparatus further includes a housing and wherein each of said first switch, second switch, humidity sensor and controller is mounted within said housing.

7. The apparatus, according to claim 6, wherein an exposed operating portion of said second switch extends through an aperture formed in a front wall of said housing.

8. The apparatus, according to claim 6, wherein said humidity sensor is mounted in close proximity to and in operative alignment with a port formed through a front wall of said housing.

9. The apparatus, according to claim 6, wherein said housing is sized for fitting into a wall-mounted electric junction box.

10. The apparatus, according to claim 2, wherein each of said humidity sensor, said first switch and said controller is mounted in close proximity to said exhaust fan.

11. The apparatus, according to claim 2, wherein said power supply is an A-D converter.

12. The apparatus, according to claim 2, wherein said apparatus consumes less than fifteen milliamps of current in a loaded condition during operation.

13. A method for operating an exhaust fan mounted within an enclosed confine in order to control at least one of a humidity and odor therewithin, said method comprising the steps of:
   (a) outputting, with a humidity sensor, a humidity signal defining level of relative humidity within said enclosed confine;
   (b) providing a reference humidity signal associated with a predetermined level of humidity;
   (c) comparing said humidity signal with said reference signal;
   (d) providing a control signal when a value of said humidity signal is equal to or greater than a value of said reference signal;
   (e) activating, with said control signal provided in step (d), a switch mounted within a path of electric power between an electric power source and said air moving device;
   (f) supplying, with said switch activated in step (e), an electric power to said air moving device;
   (g) providing a first timing circuit;
   (h) activating said first timing circuit provided in step (g) with said control signal provided in step (d);
   (i) maintaining, with said first timing circuit activated in step (h), said control signal for a first predetermined period of time when said value of said humidity signal decreases below said value of said reference signal;
   (j) providing each of a second and third timing circuits; and
   (k) maintaining, with said each of said second and third timing circuits provided in step (j), said control signal for additional periods of time.

14. In combination with an air moving device, an apparatus for controlling at least one of a humidity and odor in an enclosed confine, said apparatus comprising:
   (a) a first switch mounted within a path of electric power between an electric power source and said air moving device, said first switch operable by a presence of a control signal to supply said electric power to said air moving device and is operable by an absence of said control signal to remove said electric power therefrom;
   (b) a hollow housing sized to fit a single switch electrical junction box, said housing having a pair of flanges disposed coplanar with and setback from a generally rectangular front wall of said housing, one of said pair of flanges extending upwardly from a top wall of said housing and an opposite one of said pair of flanges extending downwardly from a bottom wall of said housing mounted within said electrical junction box;
   (c) a mounting aperture formed in each flange for securing said housing to said electrical junction box;
   (d) a threaded aperture formed in said each flange adjacent to an end thereof for enabling attachment of a cover having a rectangular opening formed therethrough, whereby said front wall of said housing fits within said rectangular opening and whereby an exterior surface of said front wall is disposed generally coplanar with an exterior surface of said housing;
   (e) a switch aperture formed through said front wall;
   (f) a port formed through said front wall and aligned with said switch aperture in a vertical direction;
   (g) a humidity sensor mounted within said housing in operative alignment with and in close proximity to said port for outputting a humidity signal defining level of relative humidity within said enclosed confine;
   (h) a second switch mounted within said housing and having an operating portion thereof extending through said switch aperture, said second switch operable for outputting a control signal; and
   (i) a control means mounted within said housing and coupled to each of said humidity sensor, said second switch and a source of electrical power, said control means operable in response to a presence of at least one of said humidity signal and said control signal for operating said exhaust fan for a predetermined duration of time after loss of said of at least one of said humidity signal and said control signal, said control means including:
      i. a resistive voltage divider for providing a reference voltage signal associated with a predetermined level of humidity,
      ii. a comparing means coupled to each of said humidity sensor and said resistive voltage divider and operable to compare said humidity signal with said reference signal and provide said control signal when a value of said humidity signal is equal to or greater than a value of said reference signal, said control signal causing said first switch to supply said electric power to said air moving device,
      iii. a first timing circuit activatable by said control signal and is operable to maintain said presence thereof for a first predetermined period of time when said value of said humidity signal decreases below said value of said reference signal,
      iv. a second timing circuit coupled to said second switch and operable thereby to maintain said control signal for a second predetermined period of time upon activation of said second switch, whereby said first switch is deactivated after expiration of said second predetermined period of time to remove said electric power from said air moving device, and
      v. a third timing circuit activatable by said second switch at a predetermined time delay after activation of said second timing circuit and is operable for a third predetermined period of time.

* * * * *